United States Patent Office 3,336,407
Patented Aug. 15, 1967

3,336,407
CATALYTIC CONVERSION OF 1,2,3,4-TETRAHYDRONAPHTHALENE, INDAN, AND OTHER MATERIALS
Ronald D. Bushick, Glen Mills, Pa., assignor to Sun Oil Company, Philadelphia, Pa., a corporation of New Jersey
No Drawing. Filed Mar. 15, 1966, Ser. No. 534,428
53 Claims. (Cl. 260—668)

This application is a continuation-in-part of my prior application Ser. No. 388,693 filed Aug. 10, 1964, now abandoned, the latter application being a continuation-in-part of my application Ser. No. 347,685, filed Feb. 27, 1964, now abandoned.

This invention relates in one aspect to a method of converting polycyclic aromatics containing a saturated ring such as 1,2,3,4-tetrahydronaphthalene and indan to (1) polycyclic aromatics containing an additional saturated ring such as sym-octahydroanthracene (herein OHA), sym-octahydrophenanthrene (herein OHP), and as-hydrindacene, and (2) diaryl alkanes such as the following phenyltetralylbutanes (hereinafter PTB) and the following phenylindanylpropanes (hereinafter PIP).

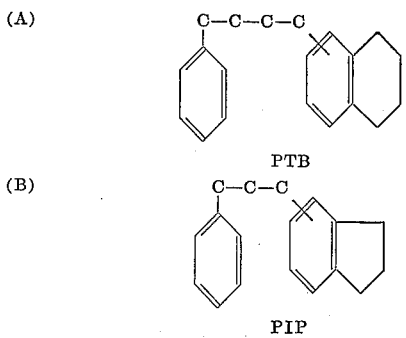

wherein the bond of the substituent which intersects the bond joining two ring carbon atoms means that the substituent is attached to either of those two ring carbon atoms. Both of the two isomers indicated by each of the above formulae A and B are referred to herein as PTB and PIP respectively. Where a specific isomer is meant it will be so indicated, thus 1 - phenyl-4,6-tetralylbutane, 1-phenyl-4-5-tetralylbutane, 1-phenyl - 3-5 - indanylpropane, and 1-phenyl-3-4-indanylpropane. The invention in another aspect relates to a method of converting diaryl alkanes to tricyclic aromatics; for example, PTB is converted to OHA and OHP and PIP is converted to as-hydrindacene. In another aspect the invention relates to products such as the diaryl alkane 1-(4-as-hydrindacene)-3-phenylpropane (herein HPP) as new compositions and to a method of preparing same. In a further aspect of the invention OHP and OHA are isomerized to OHA and OHP respectively.

The various products which can be made by the invention have a variety of uses. For example, OHA and OHP can be converted to anthracene and phenanthrene respectively by passage over a selenium catalyst at about 325° C. or to benzene tetracarboxylic acids by nitric acid oxidation, the latter process being described in the copending application of W. D. Vanderwerff, Ser. No. 370,485 filed May 27, 1964. PTB, PIP, and HPP can all be converted to wetting agents by sulfonation and HPP is also useful as an insecticide.

It is known that in the presence of AlCl₃ 1,2,3,4-tetrahydronaphthalene disproportionates to form a variety of products including OHA, OHP, and PTB. Thus,

EQUATION I

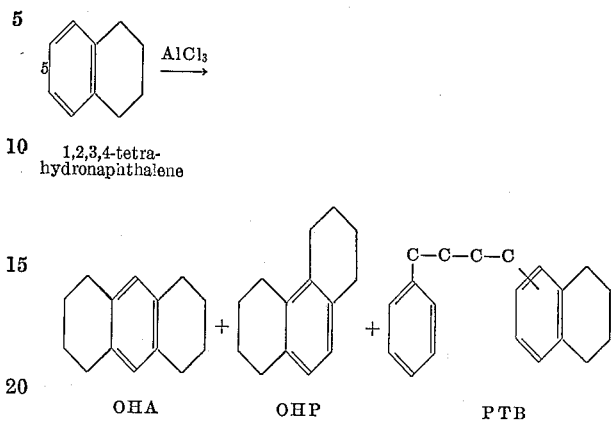

A disadvantage of this method of making OHA, OHP, and PTB is that the yields of each product are low. For example the yield of OHA and OHP in the above reaction is generally not over 15–30%. Another disadvantage is that the reaction is not very selective for any particular product. For example, it is not possible in the AlCl₃ catalyzed reaction of 1,2,3,4-tetrahydronaphthalene to make solely OHA and OHP or to make solely PTB. These and other disadvantages of the prior art are discussed in more detail hereinafter.

It has now been unexpectedly found that if the reaction depicted by Equation I is carried out in the presence of HF-BF₃ or HF-BCl₃ improved results are obtained. One improvement is that the yield of OHA, OHP, and PTB is substantially higher. For example, by using HF-BF₃ or HF-BCl₃ as catalyst OHA and OHP are obtained in almost theoretical yield, e.g., 90%. Another improvement is that by proper control of the reaction conditions, particularly the reaction temperature, OHA and OHP can be obtained to the essentially complete exclusion of PTB, and PTB can be obtained to the essentially complete exclusion of OHA and OHP. In other words the reaction is highly selective when HF-BF₃ or HF-BCl₃ is the catalyst. Additional improvements over the AlCl₃ process are that the reaction is cleaner, i.e., less tars are formed, the reaction time is shorter, and the catalyst can be regenerated without loss of activity.

I have also found that in the presence of HF-BF₃ or HF-BCl₃ indan is converted in high yield and high selectivity to either as-hydrindacene or PIP, the particular product obtained depending mainly upon the reaction temperature employed. I have also found in addition that in the presence of HF-BF₃ or HF-BCl₃ PTB is converted to OHA and OHP and that PIP is converted to as-hydrindacene. Additionally, in the presence of HF-BF₃ or HF-BCl₃ OHP can be isomerized to OHA and OHA can be isomerized to OHP. The other aspects of the invention mentioned previously are discussed more fully hereinafter.

The aspect of the invention relating to the conversion of 1,2,3,4-tetrahydronaphthalene to OHA and OHP or to PTB will be described in detail first after which the other aspects of the invention will be described in detail. In all the description it will be assumed, unless otherwise indicated, that the catalyst is HF—BF₃, although unless otherwise indicated HF—BCl₃ can also be used. The theoretical reactions involved in the formation of OHA, OHP, and PTB are as follows:

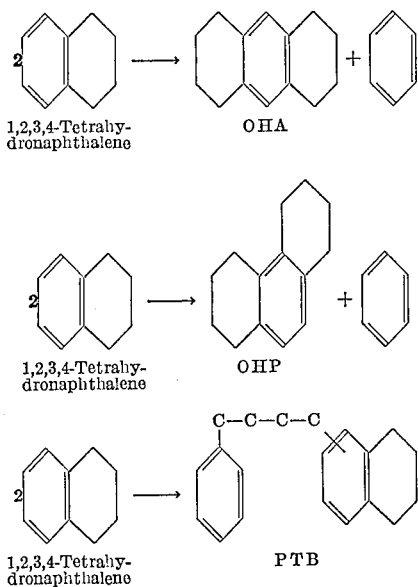

According to the invention 1,2,3,4-tetrahydronaphthalene is converted to OHA and OHP or to PTB by contacting the 1,2,3,4-tetrahydronaphthalene at certain temperatures with certain amounts of HF and BF$_3$. The following description of the reaction conditions and the method of carrying out the reaction is applicable to the preparation of PTB as well as OHA and OHP unless otherwise indicated. It should also be noted that the PTB produced by the method of the invention is essentially the -6 isomer rather than the -5 isomer. A small amount of the latter is present but it is usually not more than about 1% or so. Subsequent examples refer to the PTB content of the reaction product and the stated amount includes both isomers although as mentioned the amount of the -5 isomer is very small. Any other reference to PTB in the following description of the invention includes both isomers.

The HF should be employed in liquid phase. Although the reaction can be, and preferably is, carried out above the boiling point of HF (19.4° C.) the pressure in the reaction vessel should be sufficient to maintain the HF in liquid phase. All boiling points herein are at 760 mm. Hg absolute pressure unless otherwise stated. Normally the BF$_3$ (B.P.=—101° C.) pressure in the reaction vessel is sufficient to maintain the HF in liquid phase. If not other convenient means can be employed to insure the use of liquid HF, such as pressuring the reaction vessel with nitrogen, etc. The amount of HF employed should be at least 5 moles per mole of 1,2,3,4-tetrahydronaphthalene but is preferably at least 7 moles, more preferably at least 10 moles, per mole of 1,2,3,4-tetrahydronaphthalene. The subsequent examples show that increasing the HF:1,2,3,4-tetrahydronaphthalene ratio increases the yield of OHA and OHP or the yield of PTB, i.e., the yield of product, at least up to HF:1,2,3,4-tetrahydronaphthalene mole ratios of about 10:1, and that the high yields which characterize my methods for preparing these products are not obtained at HF:1,2,3,4-tetrahydronaphthalene ratios lower than those specified. Preferably the HF:1,2,3,4-tetrahydronaphthalene mole ratio does not exceed about 50:1, although ratios as high as 200:1 or even higher can be used if desired.

The amount of BF$_3$ used should be at least 0.5 mole per mole of 1,2,3,4-tetrahydronaphthalene and is preferably at least 0.6 mole per mole of 1,2,3,4-tetrahydronaphthalene. Although some product is obtained at BF$_3$:1,2,3,4-tetrahydronaphthalene mole ratios between 0.1:1 and 0.5:1, there is a very rapid and sharp increase in yield as the ratio exceeds 0.5:1. More preferably the BF$_3$:1,2,3,4-tetrahydronaphthalene ratio is at least 0.75:1. The yield of product is usually maximized at a BF$_3$:1,2,3,4-tetrahydronaphthalene ratio in the range of 0.5:1 to 2.0:1, consequently the amount of BF$_3$ used will normally not exceed 2 moles per mole of 1,2,3,4-tetrahydronaphthalene although amounts as high as 10 moles per mole of 1,2,3,4-tetrahydronaphthalene or even higher, e.g., 100 moles per mole of 1,2,3,4-tetrahydronaphthalene can be used if desired. The subsequent examples show more clearly the effect of the BF$_3$:1,2,3,4-tetrahydronaphthalene ratio on the yield of product.

The temperature at which the reaction is carried out will, in conjunction with the reaction time, determine the product obtained and the amount thereof. At temperatures in the range of 15–130° C. OHA and OHP can be formed in high yields and, in addition, they can be formed to the essentially complete exclusion of PTB. Preferably the reaction temperature is 30–100° C. The subsequent examples show that the yield of OHA and OHP is usually maximized at a temperature of 40–80° C., hence this is the more preferred temperature range. PTB can be formed in high yields at temperatures in the range of —100° C. to 15° C. and, in addition, can be formed in this range to the essentially complete exclusion of OHA and OHP. Preferably the temperature is in the range of —80° to 0° C., more preferably —60° to —10° C. The subsequent examples show more clearly the dependency of the product obtained on the reaction temperature. The influence of reaction time on the optimum reaction temperature is discussed subsequently.

The time for which the 1,2,3,4-tetrahydronaphthalene and HF—BF$_3$ are contacted can vary considerably. Whether the desired product is OHA—OHP or PTB, a substantial amount of reaction occurs almost immediately, i.e., within 1–2 minutes, with additional reaction occurring at a slower rate thereafter until at about 90 minutes (for a reaction temperature of 50° C.) maximum yield of product is obtained. Where the desired product is OHA and OHP the amount of PTB formed, although extremely small in any case, tends to decrease as the reaction time increases. Consequently when OHA and OHP are being prepared the reaction time will normally be at least 5 minutes preferably at least 20 minutes, more preferably at least 45 minutes. Normally the reaction time will not exceed 10 hours, usually it will not exceed 5 hours and in many cases reaction times less than 2 hours will be satisfactory. Where the desired product is PTB, the amount of OHA and OHP formed, although extremely small in any case, tends to increase as the reaction time increases. Consequently the reaction time preferably does not exceed 5 hours, more preferably it does not exceed 3 hours. In many cases reaction times less than 1 hour will be satisfactory. The minimum reaction time employed will usually be at least 0.5 minute, more frequently 5 minutes and is preferably at least 10 minutes. The subsequent examples show more clearly the effect of reaction time on yield of product.

In preparing either OHA—OHP or PTB the reaction time and temperature are interrelated in that as the time increases the temperature at which maximum yield of product is obtained decreases somewhat. Consequently it is impossible to specify any single optimum temperature or any single optimum time. This interrelation is shown more clearly in the subsequent examples. Within the temperature and time ranges specified above, however, as the temperature increases or decreases the time required to effect the same yield of product will decrease or increase, respectively. Stated in another manner the temperature is inversely proportional to the time.

The reaction can be carried out in any convenient manner using equipment of conventional type. For example, the 1,2,3,4-tetrahydronaphthalene starting material is charged to a closed reaction vessel equipped with heating and agitation means. Where the reaction temperature is less than the melting point of 1,2,3,4-tetrahydronaphthalene, −30° C., the 1,2,3,4-tetrahydronaphthalene starting material is preferably dissolved in an inert solvent such as pentane, hexane, heptane, etc. The required amount of HF is then added following which the HF-1,2,3,4-tetrahydronaphthalene mixture is heated to the desired reaction temperature. Next the desired amount of $BF_3$ is added and the vessel is then preferably shaken or the contents thereof otherwise agitated in order to insure efficient contact of the HF-$BF_3$ catalyst with the 1,2,3,4-tetrahydronaphthalene. After adding the $BF_3$ the reaction mass is then maintained at the reaction temperature for the desired contact time. The $BF_3$ is purposely added after the reaction temperature is reached because no reaction occurs until the $BF_3$ is added. Since the products obtained depend upon the reaction temperature it is generally desirable that no reaction occur until the desired temperature is reached.

At the end of the reaction period the reaction vessel contains HF, $BF_3$, either OHA and OHP or PTB, some unreacted 1,2,3,4-tetrahydronaphthalene, benzene when the product is OHA and OHP, and an almost negligible amount of other by-products. Merely opening the vessel will affect the removal of most of the $BF_3$ (B.P.=−101° C.) and much of the HF if the reaction is carried out above its boiling point (19.4° C.). Any remaining HF and any $BF_3$ dissolved therein can be distilled from the vessel. The OHA and OHP or the PTB as the case may be can be separated from the other organic materials by means described hereinafter.

If it is desired to remove the HF as a liquid rather than as a gas the reaction vessel is cooled to below 19.4° C. at the end of the reaction time, assuming that the reaction is carried out above the boiling point of HF. The vessel is then opened, which effects removal of most of the $BF_3$, and the remaining reaction mass is quenched in ice water. Two liquid layers result, an aqueous acid layer and an organic layer. If desired, the acid in this two-phase system can be neutralized by mixing the system with $Na_2CO_3$. The organic layer is then decanted and is preferably washed with water several times to remove any remaining traces of acid or any traces of $Na_2CO_3$. Dilution of the organic layer with a solvent such as pentane facilitates the decanting step.

Where the desired product is OHA and OHP, they can be recovered from the organic layer in any convenient manner. One suitable procedure involves an initial vacuum distillation at, for example, 0.1 mm. Hg pressure. All pressures herein are absolute pressures. The by-product benzene (B.P. −83° C.) distills first followed by the unreacted 1,2,3,4-tetrahydronaphthalene (B.P.= 206° C.). These distillates can be recovered together or separately and put to any use desired. For example, unreacted 1,2,3,4-tetrahydronaphthalene can be recovered separately and recycled to the reaction vessel and again contacted with HF-$BF_3$ for conversion to OHA and OHP. The OHA and OHP distill off next, sometimes with a very small amount of impurities. Distillation of the OHA and OHP sometimes leaves an almost negligible residue of high boiling by-products. OHA and OHP boil at about 292° and 295° C. at 760 mm. Hg respectively according to the few literature references although I have found, using an efficient distillation column, that they boil at about 306.5° C. and 311.7° C. at 760 mm. Hg. In any event at 0.1 mm. Hg they distill off at about 80°–85° C. If the distillation apparatus is sufficiently efficient the OHA and OHP can be distilled off and recovered separately. Usually, however, it is more convenient to distill and condense them together and recover a mixture of OHA and OHP containing, usually, a small amount of impurities. In most cases the temperature of this mixture will be above 74° C., in which case relatively pure OHA can be recovered therefrom by cooling the mixture to, say, room temperature and then separating the resulting crystallized OHA by, for example, filtration. The separated OHA, which is relatively pure OHA because its purity is substantially higher than the OHA content of the original mixture, can be further purified by recrystallization from an alcohol such as methanol at room temperature. The filtrate is a liquid mixture of OHP and a relatively small amount of OHA. It can be described as relatively pure OHP because the OHP content of the filtrate is substantially higher than the OHP content of the original mixture. If the OHA-OHP distillate fraction is condensed at, say, room temperature the condensate is a slurry of solid, relatively pure OHA, in a liquid mixture which is relatively pure OHP. In this case the relatively pure OHA can be separated immediately; there is no need to cool the mixture. A more detailed explanation for the methods just described for separating OHA and OHP from an OHA-OHP mixture is as follows: OHA and OHP melt at 74° C. and 16.7° C. respectively and above 74° C. an OHA-OHP mixture is a homogeneous liquid. If such a mixture is cooled a temperature is reached at which solid material crystallizes. This solid material is relatively pure OHA. The exact temperature at which solid material (relatively pure OHA) begins to crystallize will vary depending upon the ratio of OHA to OHP in the original mixture. In all cases, however, the temperature at which solid material crystallizes from the mixture will be lower than 74° C. In my process the ratio of OHA to OHP in the reaction product is usually about 1.3–1.4 to 1. In such cases a temperature of 20° C. is sufficient to effect crystallization of a substantial amount of relatively pure OHA; hence the original mixture is preferably cooled to at least 20° C. More preferably the original mixture is cooled to at least 10° C.

Once a temperature is reached at which relatively pure OHA has crystallized, further reductions in temperature result in crystallization of additional OHA. As the amount of crystallized OHA increases, the amount of OHA in the remaining liquid decreases or, conversely, the OHP content of the remaining liquid increases. The slurry of solid in liquid should not, obviously, be cooled to a temperature low enough to cause solidification of the entire slurry, i.e., the slurry should not be cooled below the freezing point of the original OHA-OHP mixture. The freezing point of OHA-OHP mixtures will vary depending upon the relative amount of each ingredient in the mixture. In most cases, however, the slurry can be cooled to about 5° C. without complete solidification thereof. In order to minimize OHP crystallization, the mixture is preferably not cooled below 2° C.

The separation of OHA from OHP is described in more detail in the copending application of W. D. Vanderwerff Ser. No. 347,671 filed Feb. 27, 1964. In this connection the phase diagram of the OHA-OHP system shown in the copending application of I. N. Duling, Ser. No. 434,541 filed Feb. 23, 1965 is useful.

The separated OHA can if desired be isomerized to OHP by means of HF and $BF_3$ or, conversely, the OHP remaining after separation of the OHA can if desired be isomerized to OHA. These isomerizations are described in detail subsequently.

Where the desired product is PTB it can be recovered from the organic layer by, for example, distillation at reduced pressure. At 15 mm. Hg PTB distills off at about 230°–245° C. and at 0.3 mm. Hg it distills off at about 175°–190° C. If desired the PTB can be separated by other convenient methods such as chromatographic techniques.

The following examples illustrate the preparation of OHA, OHP, and PTB according to the invention and, in addition, the effect of the various reaction conditions discussed previously upon the yield of product. The procedure in each run is essentially the same and is as follows:

The reaction vessel is a small reactor equipped with either an external shaker or an internal agitator and also equipped with heating and cooling means. The reactor is flushed out with nitrogen and is then evacuated. 1,2,3,4-tetrahydronaphthalene is then charged to the reactor followed by the HF. The amount of 1,2,3,4-tetrahydronaphthalene charged is 0.1 mole and is the same in all runs. The reactor is shaken, heated to the desired reaction temperature, and the $BF_3$ is then added. In all runs the $BF_3$ pressure is sufficient to maintain essentially all of the HF in liquid phase. The reactor is then held at the reaction temperature for the desired reaction time, the time being measured from the time of $BF_3$ addition. Shaking of the reactor continues throughout the entire reaction time. At the end of the reaction period the reactor is cooled to 20° C., opened, and the contents thereof quenched in ice. Two liquid layers result, an aqueous acid layer and an organic layer. This two-phase system is neutralized with $Na_2CO_3$ after which the organic layer is drawn off and washed several times with twice its volume of water. The organic layer is then analyzed by vapor phase chromatography. In Run 411215 only the organic layer remaining after using a small amount thereof for the chromatographic analysis is treated as follows in order to isolate OHA and OHP therefrom. The organic layer is charged to a distillation column equipped with a condenser and is distilled at a pressure of 0.1 mm. Hg. Benzene and 1,2,3,4-tetrahydronaphthalene distill first and are discarded. The material distilling between 80° and 85° C. is condensed at room temperature and collected. The condensate is a slurry of solid in liquid. The solid is separated by filtration and is dissolved in methanol at 50° C. using 15 mls. methanol per gram of solid. The methanol solution is cooled to 25° C. and the resulting crystallized solid separated by filtration. This solid analyzes 99.5% OHA.

In Run 429180 only the organic layer remaining after using a small amount thereof for the chromatographic analysis is distilled at 0.3 mm. Hg. The material distilling between 175° and 190° C. is collected and is found upon analysis to be essentially pure PTB.

Example I

This example is a series of runs at a constant HF: 1,2,3,4-tetrahydronaphthalene mole ratio of 10:1, a constant reaction time of 90 minutes, a constant temperature of 50° C., and at varying $BF_3$:1,2,3,4-tetrahydronaphthalene mole ratios. The data in Table I below show the $BF_3$:1,2,3,4-tetrahydronaphthalene mole ratio, the 1,2,3,4-tetrahydronaphthalene conversion, i.e., the weight percentage of the 1,2,3,4-tetrahydronaphthalene starting material which reacted to form products of any type, the total yield of OHA and OHP and the yield of PTB. The yield is by weight based on the total weight of 1,2,3,4-tetrahydronaphthalene starting material, not on the weight of reacted 1,2,3,4-tetrahydronaphthalene, and is calculated according to the theoretical reactions presented previously.

TABLE I
Temp.=50° C.
Time=90 min.
HF: 1,2,3,4-tetrahydronaphthalene ratio=10:1

| Run No. | Moles $BF_3$/ Mole 1,2,3,4-tetrahydronaphthalene | 1,2,3,4-tetrahydronaphthalene Conversion, Percent | Yield, Percent | |
|---|---|---|---|---|
| | | | OHA-OHP | PTB |
| 411215 | 0.15 | 48.4 | 38.8 | 4.9 |
| 411188 | 0.25 | 48.3 | 41.6 | 4.3 |
| 411187 | 0.45 | 39.0 | 30.6 | 6.0 |
| 411189 | 0.52 | 87.0 | 80.9 | 2.1 |
| 411193 | 0.62 | 90.8 | 85.5 | 1.0 |
| 411194 | 0.76 | 91.9 | 86.4 | |
| 411195 | 0.83 | 92.4 | 86.2 | |
| 411196 | 1.37 | 93.1 | 88.6 | |

It is evident from the data contained in Table I that at $BF_3$:1,2,3,4-tetrahydronaphthalene ratios above 0.5:1 extremely high yields of OHA and OHP are obtained while the yields of PTB are negligible. It is also evident that for $BF_3$:1,2,3,4-tetrahydronaphthalene ratios below 0.5:1 the yields of OHA and OHP are relatively low. It should be clearly noted that the stated yields in Table I are based on the total weight of starting material. By dividing the stated yields by the fraction of 1,2,3,4-tetrahydronaphthalene, converted it will be apparent that for $BF_3$:1,2,3,4-tetrahydronaphthalene ratios above 0.5:1 over 90% of the 1,2,3,4-tetrahydronaphthalene which reacts forms OHA and OHP.

Example II

This example is another series of runs showing the effect of the $BF_3$:1,2,3,4-tetrahydronaphthalene ratio on product yield. The only difference between this example and the previous example is that all runs in Example II are at 70° C. rather than 50° C. The reaction time and HF:1,2,3,4-tetrahydronaphthalene mole ratio are the same as in Example I. The results of the runs are summarized in Table II below.

TABLE II
Temp.=70° C.
Time=90 min.
HF: 1,2,3,4-tetrahydronaphthalene ratio=10:1

| Run No. | Moles $BF_3$/ Mole 1,2,3,4-tetrahydronaphthalene | 1,2,3,4-tetrahydronaphthalene Conversion, Percent | Yield, Percent | |
|---|---|---|---|---|
| | | | OHA-OHP | PTB |
| 411185 | 0.10 | 40.5 | 27.2 | 4.8 |
| 411179 | 0.18 | 41.5 | 29.5 | 3.2 |
| 411180 | 0.40 | 44.9 | 34.0 | 0.8 |
| 411181 | 0.62 | 95.5 | 75.2 | |
| 411182 | 0.71 | 93.2 | 77.9 | |
| 411183 | 0.95 | 92.6 | 75.0 | |
| 411184 | 1.32 | 93.8 | 84.1 | |

The data contained in Table II also show that there is a distinct increase in the yield of OHA and OHP as the $BF_3$:1,2,3,4-tetrahydronaphthalene ratio exceeds 0.5:1. The data also show that for $BF_3$:1,2,3,4-tetrahydronaphthalene ratios above 0.5:1 and other reaction conditions as stated no PTB is formed. Preferably the $BF_3$:1,2,3,4-tetrahydronaphthalene ratio is at least 0.6:1, more preferably at least 0.75:1.

Example III

This example is another series of runs showing the effect of the $BF_3$:1,2,3,4-tetrahydronaphthalene ratio on product yield. The only difference between this example and Example I is that all runs in Example III are at 30° C. rather than 50° C. The reaction time and HF: 1,2,3,4-tetrahydronaphthalene mole ratio are the same as in Example I. The results of the runs are summarized in Table III below.

TABLE III
Temp.=30° C.
Time=90 min.
HF: 1,2,3,4-tetrahydronaphthalene ratio=10:1

| Run No. | Moles $BF_3$/ Mole 1,2,3,4-tetrahydronaphthalene | 1,2,3,4-tetrahydronaphthalene Conversion, percent | Yield, percent | |
|---|---|---|---|---|
| | | | OHA-OHP | PTB |
| 411217 | 0.16 | 34.7 | 22.0 | 8.8 |
| 411205 | 0.47 | 80.4 | 56.9 | 10.7 |
| 411207 | 0.69 | 85.6 | 75.0 | 7.0 |
| 411211 | 0.94 | 83.0 | 71.9 | 6.0 |
| 411212 | 1.01 | 80.5 | 73.9 | 6.5 |
| 411218 | 1.62 | 82.8 | 63.0 | 5.2 |

The data contained in Table III also show that there is a distinct increase in the yield of OHA–OHP as the $BF_3$:1,2,3,4-tetrahydronaphthalene ratio exceeds about 0.5:1. The formation of PTB in the above runs could be avoided by using a longer reaction time.

*Example IV*

This example is six runs showing the effect of the HF:1,2,3,4-tetrahydronaphthalene ratio on the yield of product. The reaction time and temperature are 90 minutes and 50° C. respectively in all runs. The $BF_3$:1,2,3,4-tetrahydronaphthalene mole ratio is essentially the same in each run, varying between 0.6:1 and 0.7:1. From the data in Table I it is apparent that at this $BF_3$:1,2,3,4-tetrahydronaphthalene level this slight difference in the amount of $BF_3$ will not cause any significant change in product yield. The results of Example IV are tabulated in Table IV below.

TABLE IV

Temp.=50° C.
Time=90 min.
$BF_3$:1,2,3,4-tetrahydronaphthalene ratio=0.6:1–0.7:1

| Run No. | HF:1,2,3,4-tetrahydronaphthalene Mole Ratio | 1,2,3,4-tetrahydronaphthalene Conversion, percent | Yield, percent | |
|---|---|---|---|---|
| | | | OHA-OHP | PTB |
| 454994 | 1:1 | 41.5 | 37.6 | 3 |
| 454993 | 5:1 | 76.2 | 65.0 | 1.5 |
| 429158 | 9.8:1 | 93.9 | 87.2 | 0 |
| 411283 | 10.7:1 | 86.0 | 81.0 | 0 |
| 411287 | 14.3:1 | 91.0 | 84.7 | 0 |
| 454995 | 20:1 | 90.2 | 89.7 | 0 |

It is evident from the data contained in Table IV that high yields of OHA–OHP are not obtained until the HF:1,2,3,4-tetrahydronaphthalene ratio reaches about 5:1. As stated previously the amount of HF employed should be at least 5 moles, preferably at least 7 moles, more preferably at least 10 moles, per mole of 1,2,3,4-tetrahydronaphthalene.

*Example V*

This example is a series of runs showing the effect of reaction time on product and yield thereof. In each run the HF:1,2,3,4-tetrahydronaphthalene mole ratio is 10:1, the reaction temperature is 50° C., and the $BF_3$:1,2,3,4-tetrahydronaphthalene mole ratio is 0.6:1–0.65:1. The results of these runs are shown in Table V below.

TABLE V

Temp.=50° C.
HF:1,2,3,4-tetrahydronaphthalene ratio=10:1
$BF_3$:1,2,3,4-tetrahydronaphthalene ratio=0.6:1–0.65:1

| Run No. | Reaction Time in Minutes | 1,2,3,4-tetrahydronaphthalene Conversion, percent | Yield, percent | |
|---|---|---|---|---|
| | | | OHA-OHP | PTB |
| 411228 | 15 | 60.1 | 55.5 | 6.2 |
| 411229 | 30 | 69.0 | 64.9 | 3.7 |
| 411230 | 45 | 76.4 | 69.6 | 2.0 |
| 411231 | 60 | 82.3 | 73.5 | 1.4 |
| 411193 | 90 | 90.8 | 85.5 | 1.0 |
| 411193 (I-1) | 180 | 91.2 | 84.5 | |
| 411193 (I-2) | 300 | 91.5 | 84.7 | |

The data contained in Table V shows that a substantial amount of reaction occurs very rapidly followed by additional reaction at a slower rate. The data also show that as the reaction time increases the amount PTB decreases.

*Example VI*

This example is another series of runs showing the effect of reaction time on product and yield thereof. In each run the HF:1,2,3,4-tetrahydronaphthalene mole ratio is 10:1, the reaction temperature is 50° C., and the $BF_3$:1,2,3,4-tetrahydronaphthalene mole ratio is 0.60:1–0.65:1. Essentially the only difference between the runs of Examples V and VI is that mixing of the reactor ingredients is by an external shaker in Example V and by an internal agitator in Example VI. It is believed that the latter mixing device is superior hence the better yields and faster reaction in Example VI. The results of the runs of Example VI are shown in Table VI below.

TABLE VI

Temp.=50° C.
HF:1,2,3,4-tetrahydronaphthalene ratio=10:1
$BF_3$:1,2,3,4-tetrahydronaphthalene ratio=0.6:1–0.65:1

| Run No. | Reaction Time in Minutes | 1,2,3,4-tetrahydronaphthalene Conversion, percent | Yield, percent | |
|---|---|---|---|---|
| | | | OHA-OHP | PTB |
| 429160 | 10 | 83.0 | 58.8 | 11.0 |
| 429163 | 30 | 85.6 | 81.0 | 3.6 |
| 429164 | 60 | 89.3 | 84.9 | 1.1 |
| 429161 | 120 | 95.5 | 91.0 | 0 |
| 429162 | 180 | 96.6 | 93.8 | 0 |
| 429165 | 300 | 95.2 | 91.7 | 0 |

The data contained in Table VI confirm the conclusions drawn with respect to the data contained in Table V.

*Example VII*

This example is another series of runs showing the effect of reaction time on product and yield thereof. In each run the HF:1,2,3,4-tetrahydronaphthalene ratio is 10:1, the temperature is 0° C., and the $BF_3$:1,2,3,4-tetrahydronaphthalene ratio is about 1.1:1. The results of these runs are shown in Table VII below.

TABLE VII

Temp.=0° C.
HF:1,2,3,4-tetrahydronaphthalene ratio=10:1
$BF_3$:1,2,3,4-tetrahydronaphthalene ratio=1.1:1

| Run No. | Reaction Time in Minutes | 1,2,3,4-tetrahydronaphthalene Conversion, percent | Yield, percent | |
|---|---|---|---|---|
| | | | OHA-OHP | PTB |
| 429180 | 5 | 40.6 | 0 | 32.0 |
| 429181 | 15 | 62.2 | 2.0 | 55.9 |
| 429183 | 30 | 63.4 | 6.7 | 54.3 |
| 429187 | 60 | 71.6 | 8.9 | 57.2 |
| 429188 | 120 | 69.9 | 16.4 | 50.6 |
| 429184 | 180 | 67.9 | 22.9 | 41.4 |
| 429182 | 300 | 76.8 | 29.8 | 40.2 |

The data contained in Table VII also show that longer reaction times favor the formation of OHA and OHP and that once the maximum amount of PTB is formed additional reaction time results in a reduction in PTB yield. The results of Tables V, VI, and VII are discussed again subsequently.

*Example VIII*

This example is several runs showing the effect of reaction temperature on product and yield thereof. In each run the HF:1,2,3,4-tetrahydronaphthalene mole ratio is 10:1 and the reaction time is 90 minutes. In the 0° C. and the −10° C. runs the BF$_3$:1,2,3,4-tetrahydronaphthalene ratio is 1.1:1–1.2:1 and in the other runs shown is 0.6:1–0.7:1. The results of these runs are summarized in Table VIII below.

TABLE VIII

Time=90 min.
HF:1,2,3,4-tetrahydronaphthalene ratio=10:1
BF$_3$:1,2,3,4-tetrahydronaphthalene ratio=0.6:1–1.2:1

| Run No. | Reaction Temperature, ° C. | 1,2,3,4-tetra-hydronaph-thalene Conversion, Percent | Yield, Percent | |
|---|---|---|---|---|
| | | | OHA-OHP | PTB |
| 429191 | −10 | 67.1 | 3 | 58.7 |
| 429104 | 0 | 51.2 | 8.8 | 39.2 |
| 411210 | 30 | 83.2 | 74.0 | 5.4 |
| 411193 | 50 | 91.7 | 86.5 | 1.0 |
| 411181 | 70 | 94.0 | 75.8 | |

It is apparent from the data contained in Table VIII that low temperatures favor the formation of PTB whereas high temperatures favor the formation of OHA–OHP.

*Example IX*

This example is another series of runs showing the effect of reaction temperature on product and yield thereof. In each run the HF:1,2,3,4-tetrahydronaphthalene mole ratio is 10:1, the BF$_3$:1,2,3,4-tetrahydronaphthalene mole ratio is 0.6:1–0.65:1 except in the run at 0° C. in which the ratio is 1.1:1, and the reaction time is 30 minutes. As in prior examples this difference in the BF$_3$ ratios will not change the yield of product significantly. Thus the difference between this example and Example VIII is in the reaction time. The results of Example IX are summarized in Table IX below.

TABLE IX

Time=30 min.
HF:1,2,3,4-tetrahydronaphthalene ratio=10:1
BF$_3$:1,2,3,4-tetrahydronaphthalene ratio=0.6:1–1.1:1

| Run No. | Reaction Temperature, ° C. | 1,2,3,4-tetra-hydronaph-thalene Conversion, Percent | Yield, Percent | |
|---|---|---|---|---|
| | | | OHA-OHP | PTB |
| 429183 | 0 | 63.4 | 6.7 | 54.3 |
| 411229 | 50 | 69.0 | 64.9 | 3.7 |
| 442602 | 60 | 79.0 | 68.1 | 4.0 |
| 442603 | 70 | 87.1 | 74.8 | 1.8 |
| 442605 | 80 | 89.3 | 70.9 | 1 |

The data contained in Table IX also show that higher temperatures favor the formation of OHA and OHP whereas lower temperatures favor the formation of PTB.

Examples V–IX collectively show not only the effect of reaction time alone and reaction temperature alone but also the interrelation of these two variables. For example at a reaction time of 90 minutes the OHA–OHP yield is maximized at a temperature of about 50° C. under the experimental conditions described whereas the optimum temperature for a reaction time of 30 minutes is about 70° C. This is clearly demonstrated by plotting the data contained in Tables VIII and IX. Consequently, as was pointed out previously no single time or temperature can be specified as being optimum. As already stated the temperature for OHA–OHP preparation should be 15–130° C., preferably 30–100° C., more preferably 40–80° C., and that for PTB preparation should be −100 to 15° C., preferably −80 to 0° C., more preferably −60 to −10° C. For OHA–OHP preparation the reaction time should usually be 5 minutes–10 hours, preferably 20 minutes–5 hours, more preferably 45 minutes–2 hours and for PTB preparation should usually be 0.5 minutes–5 hours, preferably 5 minutes–3 hours, more preferably 10–60 minutes. Within these ranges it is apparent from the above examples not only that high yields of either product can be achieved but also that either product can be made to the essentially complete exclusion of the other. Thus the data show that OHA–OHP yields of 65–75% and even 80–90% are readily obtainable. In addition, in preparing OHA–OHP the amount of PTB formed can be maintained below 10% or even 5% or 2% without difficulty. Similarly the amount of OHA–OHP formed in preparing PTB can be maintained below 10% or even 5% without difficulty.

It was mentioned previously that BCl$_3$ can be used in place of BF$_3$. This is demonstrated by a run (454914) the same as run 411196 reported previously (Table I) except that BCl$_3$ is used instead of BF$_3$. In the BCl$_3$ run the 1,2,3,4-tetrahydronaphthalene conversion is 85.2%, the OHA–OHP yield is 70.6%, and the amount of PTB is undetermined. Although these results are not quite as good as those obtained with BF$_3$ they do show that the HF–BCl$_3$ catalyst is highly effective. To eliminate the possibility that in the BCl$_3$ run some of the BCl$_3$ was converted by reaction with HF to BF$_3$ two runs, 454946 and 454947, were made in which the reactor was pressured with 50 and 100 p.s.i.g. HCl respectively. The OHA–OHP yield in both of these runs is substantially the same and is also substantially the same as the BCl$_3$ run in which the reactor was not pressured with HCl.

According to another aspect of the invention indan is converted to as-hydrindacene or PIP by contacting the indan with HF and BF$_3$ or BCl$_3$ under certain conditions, the conditions employed determining the product obtained. The theoretical reactions involved in this aspect of the invention are as follows:

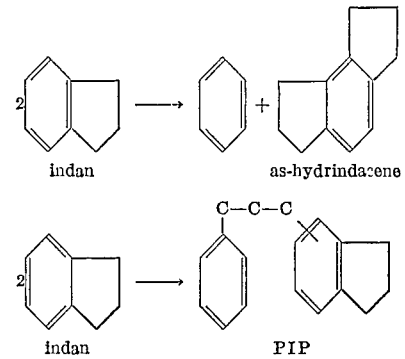

This aspect of the invention is described in more detail as follows, in which description it will again be assumed that the catalyst is HF-BF$_3$.

It was pointed out in the discussion of the preparation of PTB that the PTB produced is essentially the 6-isomer rather than the 5-isomer, the amount of the latter being almost negligible. When the starting material is indan the PIP produced contains both isomers, i.e., the −4 and −5 isomers. The −4 isomer predominates but the amount of the −5 isomer is significant, the ratio of the −4 isomer to −5 isomer generally being about 1.8 to 1. Subsequent examples refer to the PIP content of the reaction product and the stated amount includes both isomers. Any other reference to PIP in the following description of the invention includes both isomers.

In preparing either as-hydrindacene or PIP the amounts of HF and $BF_3$ should be as described previously for the $HF-BF_3$ catalyzed conversion of 1,2,3,4-tetrahydronaphthalene. Thus the molar ratio of HF to indan should be at least 5:1, preferably at least 7:1, more preferably at least 10:1. The HF should also be employed in liquid phase. The $BF_3$:indan mole ratio should be at least 0.5:1, preferably at least 0.6:1, more preferably at least 0.75:1. As in the case of the 1,2,3,4-tetrahydronaphthalene reaction there is a rapid increase in yield of product as the $BF_3$:indan mole ratio exceeds 0.5:1.

The reaction temperature employed will determine the product obtained. At relatively low temperatures high yields of PIP are obtained to the substantial exclusion of as-hydrindacene. As the temperature increases the yield of PIP decreases and the yield of as-hydrindacene increases until finally at relatively high temperatures high yields of as-hydrindacene are obtained to the substantial exclusion of PIP. In preparing as-hydrindacene the temperature should be in the range of 40–120° C., preferably 50–100° C. The more preferred temperature range is 55–85° C. In preparing PIP the reaction temperature should be —20° to 80° C., preferably 0°–60° C., more preferably 15°–45° C. The effect of reaction temperature upon the type of product and yield thereof is shown more clearly in the subsequent examples.

The reaction time, i.e., the time of contact of the $HF-BF_3$ and the indan can vary considerably. In preparing either product a substantial amount of reaction occurs within 1–2 minutes with additional reaction occurring thereafter at a slower rate. In preparing as-hydrindacene the reaction time is usually at least 2 minutes, preferably at least 10 minutes, more preferably at least 30 minutes. In most cases the reaction time will not exceed 10 hours, usually it will not exceed 5 hours and in many cases times less than 3 hours will be satisfactory. In preparing PIP the reaction time will usually be not more than 3 hours, preferably not more than 1 hour, more preferably not more than 30 minutes. The minimum reaction time will usually be 0.5 minute, more frequently 2 minutes, and preferably is at least 5 minutes. Often the reaction time will be at least 30 minutes.

With respect to product and yield thereof the reaction time and temperature are interrelated in the same manner as described in conjunction with the preparation of PTB and OHA-OHP. The subsequent examples bring this out more clearly.

The conversion of indan to as-hydrindacene or PIP can be carried out in essentially the same manner as described hereinbefore for the covnersion of 1,2,3,4-tetrahydronaphthalene to OHA and OHP or PTB, the only significant differences being in the starting material (which is indan instead of 1,2,3,4-tetrahydronaphthalene) and in the recovery of product from the organic phase resulting from either the quenching of the reaction product mixture in water or the distillation of the catalyst from the reaction product mixture. Where the product is as-hydrindacene it can be recovered from the organic layer by, say, elution chromatography or by vacuum distillation. as-Hydrindacene distills from the organic layer at about 110°–125° C. at 9 mm. Hg pressure. PIP can also be recovered from the organic layer by chromatographic techniques or by vacuum distillation. PIP distills from the organic layer at about 150°–155° C. at 0.7 mm. Hg or at about 195°–200° C. at 13 mm. Hg.

The following examples illustrate the preparation of PIP and as-hydrindacene according to the invention.

*Example X*

This example is a series of runs all of which are conducted in essentially the same manner described previously for Examples I–IX, the main differences being that 0.1 mole of indan is used instead of 0.1 mole of 1,2,3,4-tetrahydronaphthalene and, separating and recovery of product from the organic layer is by gas chromatography. The chromatographic column contains as adsorbent Chromosorb W (Johns Manville Corporation) having deposited thereon 15% silicone gum rubber (SE–54, Analytical Engineering Laboratories, Inc., Hamden, Connecticut). The column is programmed from 90°–320° C. to facilitate separation of reaction products. The products are eluted from the column with helium. In each run the HF:indan mole ratio is 10:1 and the reaction time is 90 minutes. The other reaction conditions are shown in Table X below along with the yield of as-hydrindacene and PIP in each run. The yields are based on the total weight of starting material.

TABLE X
Time—90 min.
HF: indan ratio=10:1

| Run No. | Moles $BF_3$/ Mole Indan | Reaction Temp., °C. | Indan Conversion, percent | Yield, percent | |
|---|---|---|---|---|---|
| | | | | as-Hydrindacene | PIP |
| 429178 | 0.64 | 0 | 12.6 | 0 | 8.0 |
| 429253 | 0.61 | 30 | 88.9 | 2.1 | 66.9 |
| 429147 | 0.61 | 50 | 97.7 | 32.7 | 34.7 |
| 429122 | 0.94 | 70 | 95.2 | 66.0 | 11.3 |
| 429148 | 0.94 | 90 | 94.2 | 40.4 | 7.2 |
| 429256 | 0.60 | 105 | 94.3 | 16.5 | 2.8 |

The data contained in Table X clearly show the criticality of the reaction temperature in determining the type of product formed. The optimum temperature at a 90 minute reaction time is about 70° C. for as-hydrindacene formation and is about 30° C. for the preparation of PIP. The data also show that high yields of product are obtained. For example, by dividing the stated yield of PIP at 30° C. by the fraction of indan converted it can be determined that about 90% of the indan which reacts to form any products forms PIP.

*Example XI*

This example is a run which is the same as Run 429253 above except that the $BF_3$:indan ratio is 0.11:1 instead of 0.61:1. The results of this run are shown in Table XI below, along with the results of Run 429253.

TABLE XI

Time=90 min.
HF:indan ratio=10:1

| Run No. | Moles $BF_3$/ Mole Indan | Reaction Temp., °C. | Indan Conversion, percent | Yield, Percent | |
|---|---|---|---|---|---|
| | | | | as-Hydrindacene | PIP |
| 429253 | 0.61 | 30 | 88.9 | 2.1 | 66.9 |
| 429121 | 0.11 | 30 | 4.4 | 0 | 2.7 |

It is apparent from the data contained in Table XI that a $BF_3$:indan mole ratio of 0.11:1 results in essentially no reaction at all. For the present purpose the $BF_3$:indan ratio should be at least 0.5:1, preferably at least 0.6:1, more preferably at least 0.75:1.

*Example XII*

This example is a series of runs similar to those of Example X but showing the variation in product and yield thereof with reaction time. In each run the $BF_3$:indan ratio is 0.9:1 to 1.1:1, the HF:indan ratio is 10:1 and the reaction temperature is 70° C.

TABLE XII

Temp.=70 C.
$BF_3$:indan ratio=0.9:1–1.1:1
HF:indan ratio=10:1

| Run No. | Reaction Time-Min. | Indan Conversion, Percent | Yield, Percent | |
|---|---|---|---|---|
| | | | as-Hydrindacene | PIP |
| 454962 | 5 | 91.7 | 15.2 | 64.0 |
| 454963 | 10 | 88.2 | 20.1 | 48.2 |
| 454964 | 15 | 91.0 | 34.7 | 39.2 |
| 454965 | 30 | 90.1 | 43.3 | 21.2 |
| 454966 | 60 | 94.5 | 51.7 | 10.7 |
| 429122 | 90 | 95.2 | 66.0 | 11.3 |

The results of Example XII show that longer reaction times favor the formation of as-hydrindacene whereas shorter reaction times favor the formation of PIP. When considered with Example X, Example XII shows the interdependency of reaction time and temperature. For example, at 70° C. a 5 minute reaction time results in a 64% yield of PIP where as at 30° C. about the same yield is obtained at a 90 minute reaction time.

From the data contained in Tables X–XII it is apparent that the conversion of indan to as-hydrindacene or PIP is very selective and that high yields of either product can be obtained. Thus PIP:as-hydrindacene ratios of 4:1 or even as high as 10:1 or 20:1 can be achieved. Similarly as-hydrindacene:PIP ratios of 4:1–5:1 can be obtained. Yields of 45–55% for either product are readily obtainable.

The invention has so far been described with respect to the disproportionation of tetralin and indan. As described hereinbefore the invention is applicable to other polycyclic aromatics having certain structural properties characteristic of 1,2,3,4-tetrahydronaphthalene and indan and they can be described as follows: they are described as polycyclic because they have more than one ring and they are described as aromatic because they contain at least one aromatic ring. In addition they contain a condensed ring group, i.e., a plurality of rings each of which is condensed either directly or through other rings to every other ring in the group. The group is itself characterized in that it contains an unsubstituted aromatic ring having exactly two condensed carbon atoms and an unsubstituted saturated ring having exactly two condensed carbon atoms. For example, in 1,2,3,4-tetrahydronaphthalene the aromatic ring contains four unsubstituted carbon atoms and exactly two condensed carbon atoms; likewise for the saturated ring. Typical examples of these starting materials are 1,2,3,4 - tetrahydronaphthalene, indan, 1,2,3,4-tetrahydroanthracene, 1,2,3,4,-tetrahydrophenanthrene, 1,2,3,4,9,10 - hexahydroanthracene and benz[f]indan, the nomenclature of the latter compound being according to the Ring Index. In most cases the starting material will contain less than about 3–4 rings usually having 5–6 carbon atoms per ring.

The products produced are, as already described, of two types. One type is the same as the starting material except that the originally unsubstituted aromatic ring having exactly two condensed carbon atoms has an unsubstituted saturated ring condensed therewith. The other type is a diaryl alkane which results from the originally unsubstituted saturated ring opening up at one of its condensed carbon atoms and the terminal carbon atom of the resulting chain of carbon atoms attaching to a carbon atom of an unsubstituted aromatic ring having exactly two condensed carbon atoms of another molecule of starting material.

That other starting materials such as those described above are suitable for the present purpose is shown by an experiment in which 1,2,3,4-tetrahydroanthracene is contacted with 8.2 moles HF and 0.97 mole $BF_3$, each being per mole of starting material, at a temperature of 50° C. for 90 minutes. The reaction is conducted in the same manner as the 1,2,3,4-tetrahydronaphthalene runs described hereinbefore. Analysis of the reaction product mixture showed the presence of 1,2,3,4,8,9,10,11-octahydrobenz[a]anthracene (Ring Index).

The reactions involved in the methods of the invention so far described involve the reaction of a quantity of starting material with another quantity of starting material. For this reason the reactions are referred to as self-reactions.

In Run 429148 above (Table X) the chromatographic separation technique employed also yields 1-(4-as-hydrindacene)-3-phenylpropane (HPP) as a product of the reaction. The numbering of the as-hydrindacene substituent is according to the Ring Index. As mentioned before one aspect of the invention is HPP as a new composition and a method of preparing same. This compound has the following structure:

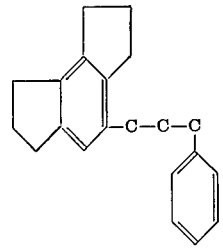

The yield of HPP in Run 429148 is 15.2% based on the following theoretical reaction:

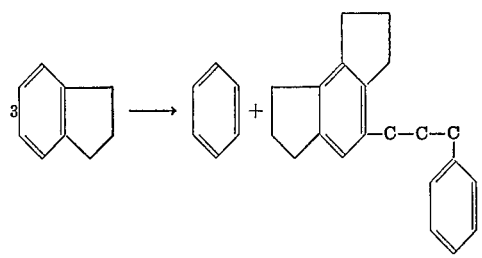

The structure of the HPP obtained in Run 429148 is shown by the following analytical results. By mass spectographic analysis it has a mass of 277 versus the theoretical 276. Its infrared spectrum shows absorption bands at 700, 750, 1740, 1790, 1860, and 1930 cm.$^{-1}$, which shows the presence of a mono-substituted benzene. The spectrum also shows absorption bands at 1740 and 1860 cm.$^{-1}$ which shows a penta-substituted benzene. Finally the spectrum shows an absorption band at 870 cm.$^{-1}$ which is due to the aromatic hydrogen on the as-hydrindacene radical. Nuclear magnetic resonance analysis shows 25.2% aromatic hydrogens, 49.9% alpha hydrogens, i.e., non-aromatic hydrogens attached to carbon atoms alpha to a benzene ring, and 24.9% beta hydrogens. This compares to the theoretical values of 25%, 50%, and 25% respectively.

The method of the invention for forming HPP involves contacting indan with liquid HF and $BF_3$ or $BCl_3$ at a temperature in the range of 20 to 150° C., preferably 40 to 120° C., more preferably 60 to 100° C. the amount of HF should be at least 5 moles, preferably at least 7 moles, more preferably at least 10 moles, per mole of indan. The amount of $BF_3$ should be at least 0.5, preferably 0.6, more preferably 0.75 mole per mole of indan. In other words, the amount of HF and $BF_3$ should be the same as in the case of the indan conversion described previously. The reaction time is not critical but will usually be between 1 minute and 10 hours, preferably between 5 minutes and 5 hours, more preferably 30 minutes to 3 hours. The reaction can be carried out in, for example, the manner described in conjunction with Run 429148.

*Example XIII*

This example is a series of runs showing the preparation of HPP. Each run is conducted in the same manner as Run 429148 supra with a $BF_3$:indan ratio of 0.6:1 to 1.17:1, an HF:indan ratio of 10:1 and a reaction time of 90 minutes. The results are as shown in Table XIII below.

TABLE XIII

| Run No. | Reaction Temp., °C. | Yield of HPP, percent |
| --- | --- | --- |
| 429253 | 30 | 3.8 |
| 442587 | 50 | 7.1 |
| 429254 | 70 | 14.1 |
| 429255 | 90 | 18.5 |
| 429148 | 90 | 15.2 |
| 429256 | 105 | 3.6 |

*Example XIV*

The runs of Example XII supra are set forth in Table XIV below but now showing the yield of HPP in each run.

TABLE XIV

| Run No. | Reaction Time, Min. | Yield of HPP, percent |
| --- | --- | --- |
| 454962 | 5 | 5.5 |
| 454963 | 10 | 7.0 |
| 454964 | 15 | 8.1 |
| 454965 | 30 | 9.5 |
| 454966 | 60 | 10.8 |
| 429122 | 90 | 7.0 |

The data contained in Table XIV show that long reaction times are not necessary to achieve significant yields of product.

According to another aspect of the invention PTB is converted to OHA and OHP and PIP is converted to as-hydrindacene by contacting the PTB or PIP with HF and $BF_3$ or $BCl_3$ under certain reaction conditions. The theoretical reactions involved are as follows:

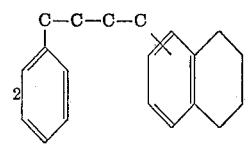

PTB

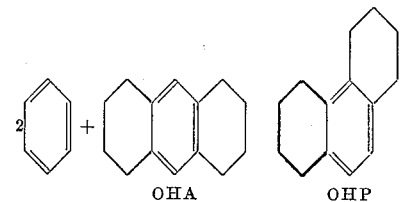

OHA    OHP

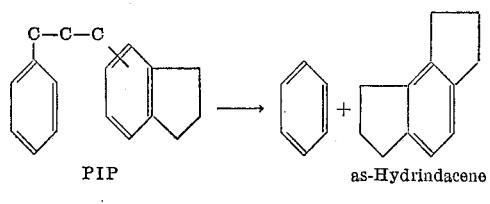

PIP            as-Hydrindacene

It should be noted that, as indicated in the above equations, regardless of which isomer of PTB or which isomer of PIP is used as the starting material the products are the same. In other words either PTB isomer yields OHA-OHP and either PIP isomer yields as-hydrindacene. It is not known whether, in the case of PIP for example, the 5-isomer preliminarily isomerizes to the 4-isomer which is then converted to as-hydrindacene or whether the 5-isomer is converted directly to as-hydrindacene. In any event, irrespective of the route in either of the above reactions, the products are as indicated.

Whether the starting material is PTB or PIP the amount of HF used should be at least 1 mole per mole of starting material. Preferably the HF:starting material mole ratio is at least 5:1, more preferably at least 8:1. The HF should be employed in liquid phase. The molar ratio of $BF_3$ to starting material should be at least 0.1:1, preferably at least 0.5:1, more preferably at least 0.75:1. The maximum amounts of HF and $BF_3$ are not critical but will usually be as described for the conversion of 1,2,3,4-tetrahydronaphthalene to OHA-OHP.

The reaction time can vary considerably. Regardless of whether the starting material is PTB or PIP a substantial amount of reaction occurs within 1–2 minutes followed by additional reaction at a slower rate. Preferably the reaction time is at least 30 minutes, more preferably at least 60 minutes. The reaction time is preferably not more than 5 hours, more preferably not more than 3 hours.

The reaction temperature depends upon the particular starting material. In the case of PTB the reaction temperature should be in the range of 15° to 130° C., preferably 30° to 100° C., more preferably 40–80° C. In the case of PIP the reaction temperature should be in the range of 40° to 120° C., preferably 50° to 100° C., more preferably 55–85° C.

The conversion of PTB to OHA and OHP and the conversion of PIP to as-hydrindacene can be carried out in essentially the same manner as described previously for the conversion of 1,2,3,4-tetrahydronaphthalene to OHA and OHP, the only differences being the specific starting material employed. The products, OHA–OHP or as-hydrindacene, can be recovered from the reaction product mixture by, say, elution chromatography or vacuum distillation.

The following example illustrates more specifically the aspect of the invention now being discussed.

*Example XV*

This example is a series of runs carried out in the same manner as the runs shown in Table X supra except that 0.1 mole of PTB is used instead of 0.1 mole of indan, the PTB is dissolved in 50 mls. of heptane, and except for the reaction conditions which are as stated in Table XV below along with the total yield of OHA and OHP, the yield being based on the total weight of starting material. The conversion of PTB in each run is essentially 100%. The PTB is obtained by the HF–BF$_3$ catalyzed conversion of 1,2,3,4-tetrahydronaphthalene as described hereinbefore.

TABLE XV

| Run No. | Moles HF/ Mole PTB | Moles BF$_3$/ Mole PTB | Reaction Temp., °C. | Reaction Time, Min. | Yield of OHA and OHP, percent |
|---|---|---|---|---|---|
| 429151 | 39 | 0.5 | 30 | 90 | 81 |
| 429143 | 11 | 0.7 | 50 | 90 | 61 |
| 429145 | 27 | 3.0 | 50 | 90 | 58 |
| 442597-2 | 274 | 31.3 | 30 | 60 | 77 |

It is evident from the data contained in Table XV that PTB can be converted to OHA and OHP in high yield by the use of HF–BF$_3$. When the starting material is PIP high yields of as-hydrindacene are obtained. A small amount of 1,2,3,4-tetrahydronaphthalene is formed in each of the above runs but as is evident from the yield data the major product is OHA–OHP.

In a further aspect the invention embodies the isomerization of OHP to OHA and the isomerization of OHA to OHP both by means of HF and BF$_3$ or BCl$_3$. This embodiment is useful particularly in conjunction with the 1,2,3,4-tetrahydronaphthalene disproportionation process described previously. If for example OHA is the desired product in the disproportionation process the OHP which is inevitably obtained in that process can be isomerized to OHA. Similarly if OHP is the desired product the OHA can be isomerized to OHP. Indeed, it is possible to carry out the isomerization in the same reactor used for the disproportionation. For example, at the end of the disproportionation the temperature and the amounts of HF and BF$_3$ are adjusted to those which are optimum for the particular isomerization desired and the isomerization is then allowed to take place.

The isomerization is carried out in a manner similar to that described previously for the 1,2,3,4-tetrahydronaphthalene disproportionation process with the exception of course that the starting material is OHA or OHP rather than 1,2,3,4-tetrahydronaphthalene. In isomerizing OHP to OHA the BF$_3$:OHP mole ratio should be at least .05:1. At a ratio of less than .05:1 essentially no isomerization takes place and above a ratio of about 1:1 the mount of OHP which isomerizes drops off very sharply. Preferably the ratio is 0.2:1 to 0.8:1, more preferably about 0.6:1. The HF:OHP mole ratio should be between 0.1:1 and 2:1, preferably 0.25:1 to 1.5:1, more preferably 0.4:1 to 1.2:1. The isomerization temperature should be in the range of −30° to 60° C., preferably 0°–50° C., more preferably about 15° to about 30° C. The reaction, i.e., isomerization, time should be at least about 5 minutes and is preferably at least about 20 minutes, more preferably at least 30 minutes. The isomerization proceeds quite rapidly initially after which the rate thereof decreases. Normally the isomerization time will not be more than 5 hours and will usually be less than 2 hours. Preferably the time is not more than 60 minutes. As in the case of the 1,2,3,4-tetrahydronaphthalene disproportionation reaction, as the isomerization temperature increases the necessary reaction time decreases. Conversely as the time increases the temperature decreases. Stated in another manner, as either temperature or time increases the amount of by-products increases and this can be offset by adjusting the other variable.

In isomerizing OHA to OHP the BF$_3$:OHA mole ratio should be about 0.7:1 and the HF:OHA mole ratio should be about 10:1. The isomerization temperature should be about 30° C. and the isomerization time should be as described for the isomerization of OHP to OHA.

The isomerizate normally contains OHA, OHP and a small amount of by-products formed during the isomerization. The by-products are mainly trans-syn-trans-perhydroanthracene and dodecahydrotriphenylene. The OHA and OHP can be separated from the by-products and from each other by the techniques described in conjunction with the 1,2,3,4-tetrahydronaphthalene disproportionation. For example the OHA and OHP can be separated from the by-products by a vacuum distillation and then from each other by fractional crystallization.

The following example illustrates this embodiment of the invention more specifically.

*Example XVI*

This example is a series of runs in which OHP is isomerized to OHA at 30° C. and with an isomerization time of 60 minutes. The HF:OHP mole ratio and the BF$_3$:OHP mole ratio are varied and are as set out in Table XVI below which also contains the results of each run. The result of each run is expressed as the OHA:OHP ratio. It is of course desired to achieve as high an OHA:OHP ratio as possible. The conversion listed is the percentage of the OHP which is converted to any other product.

In each run the OHP, usually about 0.1 mole, is charged to the reactor used in the previous examples and which is maintained at 30° C. except in Run 442650 in which the temperature is 20° C. The HF and BF$_3$ are then added after which the reactor is shaken or stirred for the 60 minutes specified. At the end of 60 minutes the reactor is opened and the contents thereof quenched in water. The OHA and OHP are then isolated by the means described in conjunction with the 1,2,3,4-tetrahydronaphthalene disproportionation reaction.

TABLE XVI

| Run No. | HF:OHP ratio | BF$^3$:OHP ratio | OHA:OHP ratio | Conversion, percent |
|---|---|---|---|---|
| 442613 | 0.18 |  | 0.01 | 2.5 |
| 442594 | 0.40 | 0.35 | 7.95 | 85.1 |
| 442593 | 0.30 | 0.31 | 12.70 | 93.0 |
| 442592 | 0.50 | 0.59 | 15.8 | 94.5 |
| 429271 | 1.23 | 0.76 | 5.98 | 87.8 |
| 429264(u) | 1.72 | 1.30 | 5.65 | 87.6 |
| 442518 | 1.19 | 0.91 | 4.92 | 87.2 |
| 442555 | 2.30 | 0.94 | 2.46 | 77.0 |
| 442517 | 2.26 | 1.17 | 2.45 | 79.3 |
| 442516 | 2.24 | 1.78 | 1.68 | 70.3 |
| 442591 | 10 | 11 | 1.60 | 63.6 |
| 442650 | 0.55 | 0.55 | 30.0 | 97.1 |

By plotting the OHA:OHP ratio first versus the HF:OHP ratio and then versus the BF$_3$:OHP ratio it is apparent that the isomerization is not very effective unless the amounts of HF and $BF_3$ are maintained within the previously specified ranges. It is also evident that a temperature of 20° C. gives better results (at 90 minutes) than 30° C.

It is also apparent from the data contained in Table XVI that extremely high OHA:OHP ratios are obtainable using the $HF-BF_3$ catalyst system. Thus ratios as high as 8:1 are easily obtainable and ratios as high as 10:1 or 12–15:1 can be achieved without undue difficulty. Moreover, the data show that ratios even as high as 20–30:1 are also obtainable. It should be noted that it has not heretofore been possible to isomerize OHP to OHA as effectively as can be done with the $HF-BF_3$ catalyst. For example the isomerization of OHP to OHA with $AlCl_3$ has been described in Schroeter, Ber. 57B, 1990–2003 (1924) and British Patent 694,961. In the former reference only about 50% of the OHP charge was isomerized to OHA yielding an OHA:OHP ratio of only 1:1. In the aforesaid British patent about 84% of the charge was converted to products containing 70% OHA and 13% by-products yielding an OHA:OHP ratio of approximately 4.3:1. With $HF:BF_3$ OHA:OHP ratios 300–400% better than those obtainable with $AlCl_3$ can be achieved. Furthermore, the results shown in Table XVI are for an isomerization time of 60 minutes. This is considerably shorter than the 15 hours specified in the aforesaid Schroeter reference and the 10–24 hours recommended in the aforesaid British patent.

It was mentioned earlier that the $HF-BF_3$ or $HF-BCl_3$ catalyst is vastly superior to $AlCl_3$ for converting 1,2,3,4-tetrahydronaphthalene to OHA and OHP. This superiority exists in a number of aspects all of which would be highly important in a commercial operation. The following discussion describes these aspects more specifically, in which discussion my catalyst systems will, as in all the previous descriptions, be referred to as $HF-BF_3$.

(1) It has been shown previously herein that OHA-OHP yields based on the total weight of 1,2,3,4-tetrahydronaphthalene charge of 75–95% are obtainable without difficulty with $HF-BF_3$. On the other hand with an $AlCl_3$ catalyst the maximum yield is about 25–35%. This is shown more clearly by the data contained in Table XVII which presents the results of several runs made analogously to the $HF-BF_3$ catalyzed 1,2,3,4-tetrahydronaphthalene disproportionation runs described supra except that the catalyst is $AlCl_3$. The reaction conditions are as specified in the table.

TABLE XVII
2.0 Mole Percent $AlCl_3$

| Reaction Temp., ° C. | Reaction Time, hrs. | 1,2,3,4-tetrahydronaphthalene Conversion, percent | Yield—percent | |
|---|---|---|---|---|
| | | | OHA-OHP | PTB |
| 25 | 20 | 24.5 | 7.8 | 14.5 |
| 40 | 20 | 29.5 | 18.6 | 7.3 |
| 100 | 1 | 37.3 | 25.7 | 7.4 |
| 100 | 100 | 38.8 | 27.9 | 6.4 |

Efforts were made to improve the yield with $AlCl_3$ by varying reaction time and temperature, amount of $AlCl_3$ and by carrying out the disproportionation in an atmosphere of HCl. This latter technique is a well-known method for improving the catalytic efficiency of $AlCl_3$. Table XVIII below shows the results of runs made at 65° C., at 1 atmosphere HCl, and at other conditions as specified.

TABLE XVIII

| Reaction Time, Min. | 1,2,3,4-tetrahydronaphthalene Conversion, Percent | Yield, Percent | |
|---|---|---|---|
| | | OHA-OHP | PTB |
| 0.5 Mole Percent HCl | | | |
| 15 | 19.4 | 0.3 | 6.8 |
| 30 | 20.2 | 0.6 | 7.2 |
| 62 | 21.5 | 1.8 | 7.9 |
| 120 | 21.5 | 3.2 | 7.9 |
| 240 | 22.8 | 4.4 | 6.8 |
| 365 | 26.4 | 5.5 | 7.1 |
| 425 | 27.9 | 5.9 | 7.1 |
| 5.0 Mole Percent $AlCl_3$ | | | |
| 15 | 20.4 | 7.3 | 8.3 |
| 30 | 24.6 | 12.8 | 7.1 |
| 60 | 25.6 | 19.2 | 6.2 |
| 90 | 32.8 | 22.2 | 5.8 |
| 120 | 32.3 | 28.6 | 5.5 |
| 10 Mole Percent $AlCl_3$ | | | |
| 15 | 26.9 | 10.2 | 6.2 |
| 35 | 33.8 | 19.8 | 4.7 |
| 60 | 40.3 | 24.6 | 3.8 |
| 90 | 41.0 | 30.0 | 3.3 |
| 115 | 45.9 | 32.7 | 3.0 |

Table XIX shows the results of a number of runs made at 5 mole percent $AlCl_3$, 1 atmosphere HCl, and varying reaction temperatures and times.

TABLE XIX

| Reaction Time, Min. | 1,2,3,4-tetrahydronaphthalene Conversion, Percent | Yield, Percent | |
|---|---|---|---|
| | | OHA-OHP | PTB |
| Temp.=45° C. | | | |
| 30 | 16.4 | 6.4 | 8.3 |
| 60 | 19.4 | 9.6 | 7.4 |
| 90 | 20.2 | 11.1 | 6.8 |
| 120 | 21.7 | 13.1 | 6.8 |
| 225 | 25.8 | 19.2 | 6.5 |
| Temp.=65° C. | | | |
| 30 | 24.6 | 12.9 | 7.1 |
| 60 | 28.9 | 19.2 | 6.2 |
| 90 | 32.8 | 22.2 | 5.8 |
| 120 | 32.3 | 28.6 | 5.5 |
| Temp.=85° C. | | | |
| 30 | 30.7 | 23.9 | 4.7 |
| 60 | 38.0 | 30.1 | 4.0 |
| 90 | 42.3 | 30.0 | 3.6 |
| 150 | 38.2 | 33.2 | 3.6 |

Examination of the data in Tables XVII–XIX shows that the maximum yield obtainable with $AlCl_3$ is about 30%, distinctly less than can be achieved with $HF-BF_3$.

Carrying out the $AlCl_3$ catalyzed disproportionation in the presence of hydrogen (another known technique for improving the catalytic efficiency of $AlCl_3$), in the presence of higher HCl pressures, or in the presence of both $H_2$ and HCl does not result in significantly different yields. This is apparent from Table XX which shows the results of $AlCl_3$ runs at a 60 minute reaction time and other conditions as stated.

TABLE XX

| Mole percent $AlCl_3$ | $H_2$ press. (p.s.i.a.) | HCl press. (p.s.i.a.) | Reaction temp., °C. | 1,2,3,4-tetra-hydronaphthalene conv., percent | Yield, percent | |
|---|---|---|---|---|---|---|
| | | | | | OHA-OHP | PTB |
| 5 | 200 | | 65 | 17.4 | 5.1 | 11.2 |
| 10 | 200 | | 65 | 34.0 | 24.2 | 4.4 |
| 15 | 300 | | 75 | 47.7 | 31.6 | 7.2 |
| 10 | 100 | 200 | 65 | 46.7 | 27.4 | 4.3 |
| 10 | 100 | 200 | 100 | 50.9 | 27.0 | 2.6 |
| 10 | | 400 | 65 | 38.1 | 27.6 | 2.3 |
| 10 | | 14.7 | 65 | 40.3 | 24.6 | 3.8 |
| 5 | | 14.7 | 65 | 28.9 | 19.2 | 6.2 |

(2) A second disadvantage of the $AlCl_3$ process is that it produces the particularly undesirable by-product diphenylbutane. This by-product is not produced in the $HF-BF_3$ process or if it is produced it is converted to other products such as 1,2,3,4-tetrahydronaphthalene or benzene. In any event in the $AlCl_3$ runs described herein diphenylbutane was detected in significant amounts by chromatographic analysis of the reaction product mixtures. Conversely, the same analysis of $HF-BF_3$ runs described herein is negative, i.e., this by-product is not present in the reaction product mixture.

Diphenylbutane is particularly undesirable because its physical properties, particularly its boiling point, are very similar to those of OHP hence it is very difficult to separate from OHP. This means not only that pure OHP is difficult to isolate but also that if OHP is to be recycled to the disproportionation vessel for isomerization to OHA the diphenylbutane will accumulate in the system. Such an accumulation will eventually shut down the process unless a purge stream is taken but a purge stream also involves the loss of the desirable OHP. All these problems are avoided with an $HF-BF_3$ catalyst.

(3) A third disadvantage of the $AlCl_3$ process is that it is not nearly as selective as the $HF-BF_3$ process. It has been shown hereinbefore that with $HF-BF_3$ either OHA-OHP or PTB can be made to the essentially complete exclusion of the other. An examination of the data contained in Tables XVII-XX shows, for example, that the highest ratio of OHA-OHP to PTB is about 10:1. On the other hand the $HF-BF_3$ data presented supra shows that an infinitely high (zero PTB) OHA-OHP:PTB ratio is readily obtainable and that ratios of about 40:1 to about 80:1 are almost always obtained. This selectivity is an important factor because in a commercial operation it will usually be desirable to either make only one product or at least only one product at a time.

(4) A fourth disadvantage of the $AlCl_3$ process is the nature of the by-products formed. Both $AlCl_3$ and $HF-BF_3$ form some by-products which have not been listed in the tables herein because all of them have not been completely identified. However, they are part of the reaction product mixture. As previously described one method of working up the reaction product mixture involves quenching it in water, adding pentane as a solvent or diluent for the reaction products, decanting the pentane solution, and recovering the desired products from the latter solution. The use of the pentane improves the separation of the organic phase from the aqueous phase. In the $HF-BF_3$ process the organic products dissolve in pentane without difficulty, i.e., in 1-2 minutes, whereas with $AlCl_3$ dissolution takes much longer. Whatever the reason therefor, this difference in solution rate would be an important factor in a commercial operation.

(5) A fifth disadvantage of the $AlCl_3$ process is that the reaction time is much longer than is required with $HF-BF_3$. In other words, less time is required with $HF-BF_3$ to make the same or higher yield of product than is required with $AlCl_3$. This is clearly shown by the data previously presented. For example Table XVII shows that a yield of 25.7% OHA-OHP can be achieved with $AlCl_3$ in one hour whereas Table IV shows that an OHA-OHP yield of 55.5% is obtained in 15 minutes. Stated in another manner a 100% higher yield is achieved with $HF-BF_3$ in only 25% of the time.

(6) Another disadvantage of the $AlCl_3$ process arises out of the nature of the high boiling by-products made in that process. By high boiling by-products is meant the reaction products boiling above OHA and OHP. The disadvantage is that the high boiling by-products from the $HF-BF_3$ process can be readily converted to OHA-OHP by further treatment with $HF-BF_3$ whereas those in the $AlCl_3$ process are not readily converted to OHA-OHP by further treatment with $AlCl_3$. The high boiling by-products from the $AlCl_3$ process normally contain about 60% PTB, some diphenylbutane, and some other materials not readily identifiable. The high boiling by-products from the $HF-BF_3$ process contain little or no PTB (assuming OHA-OHP is the desired product) with the balance being other compounds all of which have not been completely identified. The difference in the facility with which the high boiling by-products from each process can be converted to OHA-OHP is illustrated in the following examples. Some example numbers have been skipped in order to maintain correspondence between example numbers and table numbers.

*Example XXI*

This example is a series of two runs in which the starting material is a high boiling fraction distilled from the reaction product mixture of one of the $AlCl_3$ runs described supra. The high boiling fraction is everything distillable boiling above OHA and OHP. The efficiency of the distillation equipment is such that the distillate actually contains 90.5% (by weight) high boiling fraction and 9½% OHA-OHP. The high boiling fraction contains 61% PTB and the 9½% OHA-OHP also includes some diphenylbutane. In one run 100 parts of this distillate, i.e. 90.5 parts high boiling fraction and 9.5 parts OHA-OHP is contacted with 2 mole percent $AlCl_3$ at 90° C. for one hour. The amount of $AlCl_3$ is based on the amount of high boiling fraction and the molecular weight of the latter is assumed to be 300. The reaction product mixture is then analyzed and is found to contain on a benzene-free basis 14.6% 1,2,3,4-tetrahydronaphthalene, 10.9% OHA-OHP (including diphenylbutane) with the balance being high boiling fraction. The other run is identical except that 5 mole percent $AlCl_3$ is used. In this case the reaction product mixture analyzes 56.1% 1,2,3,4-tetrahydronaphthalene, 12.5% OHA-OHP (including diphenylbutane), the balance being high boiling material, i.e., products boiling above OHA and OHP. When it is considered that the starting material contains 9½% OHA-OHP the results show that very little OHA-OHP is produced. In the second run a substantial amount of 1,2,3,4-tetrahydronaphthalene is produced and although this is a more desirable material than the high boiling material it is not of course as desirable as OHA and OHP.

Example XXII

This example is a run in which the starting material is a high boiling fraction distilled from the reaction product mixture of one of the HF–BF$_3$ runs described supra. The high boiling fraction analyzes 93.4% high boiling material and 6.6% OHA–OHP. The high boiling fraction contains a negligible amount of PTB. This high boiling fraction is contacted at 50° C. for one hour with HF and BF$_3$, the amount of HF being 9.4 moles per mole of high boiling fraction and the amount of BF$_3$ being 0.67 moles per mole of high boiling fraction. As in the previous example an average molecular weight of 300 is used for calculation of mole ratios. It will be noted that the 50° C. temperature in this example is about the optimum temperature for the HF–BF$_3$ process for making OHA–OHP and that the 90° C. temperature used in the prior example is about the optimum temperature for making OHA–OHP in the AlCl$_3$ process. The reaction product mixture is analyzed as in the previous example and is found to contain 7.8% 1,2,3,4-tetrahydronaphthalene, 56.7% OHA–OHP and 35.4% high boiling material. Even when allowance is made for the 6.4% OHA–OHP in the starting material these results show that a very substantial quantity of the high boiling fraction is converted to OHA–OHP.

The advantage resulting from being able to convert a substantial portion of the high boiling fraction to OHA–OHP is readily apparent. It means that the high boiling fraction can be recycled to the disproportionation vessel and the ultimate yield of OHA–OHP thereby increased. In the AlCl$_3$ process the high boiling fraction would have to be either discarded or some new use found for it.

(7) A further advantage of the HF–BF$_3$ catalyzed disproportionation process over the AlCl$_3$ process is that in the former the catalyst can be recovered and reused without deactivation thereof. A convenient method of effecting such recovery has been described hereinbefore, i.e., at the end of the disproportionation the HF and the BF$_3$ are distilled from the reaction vessel. They can then be reused to catalyze the disproportionation of additional 1,2,3,4-tetrahydronaphthalene and it will be found that the yield of OHA–OHP in the subsequent disproportionation is essentially the same as in the first disproportionation. This is shown by two runs in each of which 1,2,3,4-tetrahydronaphthalene is disproportionated at 50° C. for 90 minutes with an HF:1,2,3,4-tetrahydronaphthalene ratio of 10:1 (20.0 gms. HF) and a BF$_3$:1,2,3,4-tetrahydronaphthalene ratio of 0.6:1 (4.1 gms. BF$_3$). In the first run fresh HF and BF$_3$ are used and in the second run the HF and BF$_3$ are obtained by distilling same from the reaction product mixture at the end of the first run. The total amount recovered by such distillation is 24.2 gms. The yield of OHA–OHP in the second run is exactly 1.0% higher than in the first run which clearly shows that no deactivation of the HF–BF$_3$ catalyst occurs.

If AlCl$_3$ is used as the catalyst it gradually deactivates and must eventually be replaced. If AlCl$_3$ per se is used the only practical means of recovering the catalyst is to quench the reaction product mixture in dilute HCl. This results in a dilute HCl solution of hydrated AlCl$_3$ and an organic phase immiscible therewith which contains the various reaction products. This technique completely deactivates the AlCl$_3$ because hydrated AlCl$_3$ has no catalytic activity. If instead of using AlCl$_3$ per se the AlCl$_3$ is used in the form of a liquid complex with HCl and a compound such as 1,2,3,4-tetrahydronaphthalene then the catalyst system remains as a separate phase throughout the disproportionation and can be readily decanted from the organic phase containing the various reaction products. This procedure, described in detail in the copending application of A. Schneider, Ser. No. 401,663, filed Oct. 5, 1964, permits ready recovery and reuse of the catalyst. Unfortunately however, the catalyst phase is gradually deactivated so that it must eventually be discarded and replaced. In other words, the AlCl$_3$ complex yields more OHA–OHP per gram of AlCl$_3$ than can be obtained with AlCl$_3$ per se but the amount of OHA–OHP decreases in each subsequent disproportionation which means that the catalyst is gradually becoming deactivated. As described above with HF–BF$_3$ no such deactivation occurs.

The invention claimed is:

1. Method which comprises (1) contacting with liquid HF and boron trihalide a starting material characterized in that it is a polycyclic aromatic containing a condensed ring group having an unsubstituted aromatic ring with exactly two condensed carbon atoms and an unsubstituted saturated ring with exactly two condensed carbon atoms, the amounts of HF and boron trihalide being at least 5 moles per mole of said starting material and at least 0.5 mole per mole of said starting material respectively, said contacting being for a time sufficient to effect self-reaction of said starting material and (2) recovering from the reaction product mixture a compound selected from the group consisting of diaryl alkanes and polycyclic aromatic compounds containing one more unsubstituted saturated ring having exactly two condensed carbon atoms than said starting material, said trihalide being BF$_3$ or BCl$_3$.

2. Method which comprises contacting 1,2,3,4-tetrahydronaphthalene with (1) at least 5 moles liquid HF per mole of 1,2,3,4-tetrahydronaphthalene and (2) at least 0.5 mole BF$_3$ or BCl$_3$ per mole of 1,2,3,4-tetrahydronaphthalene at a temperature in the range of −100° to 130° C. for a time sufficient to effect self-reaction of said 1,2,3,4-tetrahydronaphthalene, and recovering from the reaction product mixture a compound selected from the group consisting of octahydroanthracene, octahydrophenanthrene, and phenyltetralylbutane.

3. Method according to claim 2 wherein said temperature is in the range of 15° to 130° C. and the compound recovered is selected from the group consisting of octahydroanthracene and octahydrophenanthrene.

4. Method according to claim 3 wherein said temperature is in the range of 40° to 80° C.

5. Method according to claim 3 wherein octahydroanthracene and octahydrophenanthrene are recovered from the reaction product mixture in a yield of over 75%.

6. Method according to claim 3 wherein both octahydroanthracene and octahydrophenanthrene are recovered and the octahydrophenanthrene is thereafter catalytically isomerized with HF and BF$_3$ or HF and BCl$_3$ to octahydroanthracene.

7. Method according to claim 6 wherein the ratio of octahydroanthracene to octahydrophenanthrene in the isomerizate is at least 10 to 1.

8. Method according to claim 3 wherein said time is in the range of 1 minute to 2 hours.

9. Method according to claim 3 wherein the reaction product mixture is essentially free of phenyltetralylbutane.

10. Method according to claim 3 wherein the boron compound is BF$_3$.

11. Method according to claim 2 wherein the amount of liquid HF is at least 7 moles per mole of 1,2,3,4-tetrahydronaphthalene and the amount of BF$_3$ or BCl$_3$ is at least 0.6 mole per mole of 1,2,3,4-tetrahydronaphthalene.

12. Method according to claim 2 wherein said temperature is in the range of −100° to 15° C. and the compound recovered is phenyltetralylbutane.

13. Method according to claim 12 wherein said temperature is in the range of −60° to 10° C.

14. Method according to claim 12 wherein the reaction product mixture is essentially free of octahydroanthracene and octahydrophenanthrene.

15. Method according to claim 12 wherein said time is in the range of 0.5 minute to 1 hour.

16. Method according to claim 12 wherein the amount of liquid HF is at least 7 moles per mole of 1,2,3,4-tetrahydronaphthalene and the amount of $BF_3$ or $BCl_3$ is at least 0.6 mole per mole of 1,2,3,4-tetrahydronaphthalene.

17. Method which comprises contacting 1,2,3,4-tetrahydronaphthalene with (1) at least 5 moles liquid HF per mole of 1,2,3,4-tetrahydronaphthalene and (2) at least 0.5 mole boron trihalide per mole of 1,2,3,4-tetrahydronaphthalene at a temperature in the range of 15° to 130° C. for a time sufficient to effect disproportionation of said 1,2,3,4-tetrahydronaphthalene to octahydroanthracene and octahydrophenanthrene, said boron trihalide being $BF_3$ or $BCl_3$ bringing the temperature, the amount of HF, and the amount of $BF_3$ or $BCl_3$ in the reaction product mixture to −30°–60° C., .1–2 moles HF per mole of said octahydroanthracene, .05–1 mole boron trihalide per mole of said octahydroanthracene, respectively, thereby to effect isomerization of the octahydrophenanthrene therein to octahydroanthracene, the ratio of the octahydroanthracene resulting from said isomerization to the remaining octahydrophenanthrene being at least 10 to 1, and recovering octahydroanthracene from the resulting isomerizate.

18. Method which comprises contacting indan with (1) at least 5 moles liquid HF per mole of indan and (2) at least 0.5 mole $BF_3$ or $BCl_3$ per mole of indan at a temperature in the range of −20° to 120° C. for a time sufficient to effect self-reaction of said indan, and recovering from the reaction product mixture a compound selected from the group consisting of as-hydrindacene and phenylindanylpropane.

19. Method according to claim 18 wherein said temperature is in the range of 40° to 120° C. and the compound recovered is as-hydrindacene.

20. Method according to claim 19 wherein said temperature is in the range of 50° to 100° C.

21. Method according to claim 19 wherein said time is in the range of 1 minute to 5 hours.

22. Method according to claim 19 wherein the ratio of as-hydrindacene to phenylindanylpropane in the reaction product mixture is at least 4 to 1.

23. Method according to claim 18 wherein the amount of liquid HF is at least 7 moles per mole of indan and the amount of $BF_3$ or $BCl_3$ is at least 0.6 mole per mole of indan.

24. Method according to claim 18 wherein said temperature is in the range of −20° to 80° C. and the product recovered is phenylindanylpropane.

25. Method according to claim 24 wherein said temperature is in the range of 0° to 60° C.

26. Method according to claim 24 wherein said time is in the range of .5 minute to 1 hour.

27. Method according to claim 18 wherein the boron compound is $BF_3$.

28. Method according to claim 24 wherein the ratio of phenylindanylpropane to as-hydrindacene in the reaction product mixture is at least 4 to 1.

29. 1-(4-as-hydrindacene)-3-phenylpropane.

30. Method of preparing 1-(4-as-hydrindacene)-3-phenylpropane which comprises contacting indan with (1) at least 5 moles liquid HF per mole of indan and (2) at least 0.5 mole $BF_3$ or $BCl_3$ per mole of indan at a temperature in the range of 20° to 150° C. for a time of at least one minute and recovering 1-(4-as-hydrindacene)-3-phenylpropane from the reaction product mixture.

31. Method according to claim 30 wherein the amount of liquid HF is at least 7 moles per mole of indan and the amount of $BF_3$ or $BCl_3$ is at least 0.6 mole per mole of indan.

32. Method according to claim 30 wherein the temperature is in the range of 40° to 120° C.

33. Method according to claim 30 wherein said time is in the range of 5 minutes to 3 hours.

34. Method according to claim 30 wherein the boron compound is $BF_3$.

35. Method which comprises contacting phenyltetralylbutane with (1) at least 1 mole liquid HF per mole of phenyltetralylbutane and (2) at least 0.1 mole $BF_3$ or $BCl_3$ per mole of phenyltetralylbutane at a temperature in the range of 15° to 130° C. for a time sufficient to effect reaction of said phenyltetralylbutane, and recovering from the reaction product mixture a compound selected from the group consisting of octahydroanthracene and octahydrophenanthrene.

36. Method according to claim 35 wherein the amount of HF is at least 5 moles and the amount of $BF_3$ or $BCl_3$ is at least 0.5 mole, each being per mole of phenyltetralylbutane.

37. Method according to claim 35 wherein the temperature is in the range of 30° to 100° C.

38. Method according to claim 35 wherein the time is in the range of 2 minutes to 3 hours.

39. Method according to claim 35 wherein the boron compound is $BF_3$.

40. Method which comprises contacting phenylindanylpropane with (1) at least 1 mole liquid HF per mole of phenylindanylpropane and (2) at least 0.1 mole $BF_3$ or $BCl_3$ per mole of phenylindanylpropane at a temperature in the range of 40° to 120° C. for a time sufficient to effect reaction of said phenylindanylpropane, and recovering from the reaction product mixture as-hydrindacene.

41. Method according to claim 40 wherein the amount of HF is at least 5 moles and the amount of $BF_3$ or $BCl_3$ is at least 0.5 mole, each being per mole of phenylindanylpropane.

42. Method according to claim 40 wherein the temperature is in the range of 50° to 100° C.

43. Method according to claim 40 wherein the time is in the range of 2 minutes to 3 hours.

44. Method according to claim 40 wherein the boron compound is $BF_3$.

45. Method which comprises contacting octahydrophenanthrene with (1) 0.1–2.0 moles liquid HF per mole of octahydrophenanthrene and (2) .05–1 mole $BF_3$ or $BCl_3$ per mole of octahydrophenanthrene at a temperature of −30° to 60° C. for a time sufficient to effect isomerization of said octahydrophenanthrene to octahydroanthracene and recovering said octahydroanthracene.

46. Method according to claim 45 wherein the ratio of octahydroanthracene to octahydrophenanthrene in the isomerizate is at least 10 to 1.

47. Method according to claim 45 wherein said temperature is 0° to 50° C.

48. Method according to claim 45 wherein said time is 5 minutes to 60 minutes.

49. Method according to claim 45 wherein the boron compound is $BF_3$.

50. Method according to claim 45 wherein the amount of HF is 0.25 to 1.5 moles and the amount of $BF_3$ or $BCl_3$ is 0.2 to 0.8 mole, each being per mole of octahydrophenanthrene.

51. Method according to claim 45 wherein the amount of HF is 0.4 to 1.2 moles and the amount of $BF_3$ or $BCl_3$ is about 0.6 mole, each being per mole of octahydrophenanthrene.

52. Method according to claim 45 wherein said temperature is about 15° to about 30° C.

53. Method which comprises contacting octahydroanthracene with (1) about 10 moles liquid HF and (2) about 0.7 moles $BF_3$ or $BCl_3$, each being per mole of octahydroanthracene, at a temperature of about 30° C. for a time sufficient to effect isomerization of said octahydroanthrecene to octahydrophenanthrene, and recovering said octahydrophenanthrene.

(References on following page)

References Cited

UNITED STATES PATENTS

| | | | |
|---|---|---|---|
| 2,884,469 | 4/1959 | McCaulay | 260—671 X |
| 3,197,518 | 7/1965 | Chapman et al. | 260—668 |
| 3,244,758 | 4/1966 | Eberhardt | 260—668 |

FOREIGN PATENTS 694,961   7/1953   Great Britain.

DELBERT E. GANTZ, *Primary Examiner.*

C. R. DAVIS, *Assistant Examiner.*